(12) United States Patent
Sishtla (10) Patent No.: US 11,846,296 B2
(45) Date of Patent: Dec. 19, 2023

(54) FLUSHING OF A TOUCHDOWN BEARING

(71) Applicant: Carrier Corporation, Palm Beach Gardens, FL (US)

(72) Inventor: Vishnu M. Sishtla, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 272 days.

(21) Appl. No.: 17/249,298

(22) Filed: Feb. 26, 2021

(65) Prior Publication Data

US 2021/0285453 A1   Sep. 16, 2021

Related U.S. Application Data

(60) Provisional application No. 62/989,166, filed on Mar. 13, 2020.

(51) Int. Cl.
| | | |
|---|---|---|
| *F04D 29/058* | (2006.01) | |
| *F04D 25/06* | (2006.01) | |
| (Continued) | | |

(52) U.S. Cl.
CPC .......... *F04D 29/058* (2013.01); *F04D 17/10* (2013.01); *F04D 25/06* (2013.01); *F04D 29/048* (2013.01); *F04D 29/057* (2013.01); *F04D 29/059* (2013.01); *F04D 29/063* (2013.01); *F04D 29/5806* (2013.01); *F16C 32/0442* (2013.01); *F16C 32/0474* (2013.01); *F16C 33/6659* (2013.01); *F25B 1/053* (2013.01); *F25B 31/002* (2013.01); *F25B 31/006* (2013.01); *F25B 31/008* (2013.01); *H02K 7/09* (2013.01); *F04C 2/025* (2013.01); *F04C 2240/40* (2013.01);
(Continued)

(58) Field of Classification Search
CPC ...... F04D 29/058; F04D 25/06; F04D 29/059; F04D 29/5806; F04D 17/10; F04D 29/048; F04D 29/057; F04D 29/063; F16C 2360/44; F16C 32/0442; F16C 2362/52; F16C 32/0474; F16C 33/6659; F25B 1/053; F25B 31/008; F25B 31/002; F25B 31/006; H02K 7/09; F04C 2/025; F04C 2240/40; F04C 2240/50
See application file for complete search history.

(56) References Cited

U.S. PATENT DOCUMENTS

| | | | | |
|---|---|---|---|---|
| 8,104,298 | B2 * | 1/2012 | Sishtla | ............... F04D 29/059 62/84 |
| 2019/0211834 | A1 * | 7/2019 | Hasegawa | ............... F25B 1/053 |

FOREIGN PATENT DOCUMENTS

JP          8042480 A       2/1996

* cited by examiner

*Primary Examiner* — Peter J Bertheaud
(74) *Attorney, Agent, or Firm* — Patricia S. Whitehouse (57) ABSTRACT

A compressor with a touchdown bearing and a supply line for injecting a working fluid toward the touchdown bearing, and a vapor compression system incorporating the same are provided. The supply line injects working fluid approximately continuously when the compressor is operational. The compressor includes a magnetic bearing for levitating the rotating shaft when the compressor is operational. The touchdown bearing is used to support the rotating shaft when the compressor is shutdown. The touchdown bearing may be disposed, at least partially, between a pair of races. The injecting of the working fluid may cause the touchdown bearing to rotate between the races. The injecting of the working fluid may help mitigate a buildup of a debris between the touchdown bearing and the races.

19 Claims, 5 Drawing Sheets

(51) Int. Cl.
*F04D 29/048* (2006.01)
*F16C 32/04* (2006.01)
*F04D 29/059* (2006.01)
*F04D 29/057* (2006.01)
*F25B 31/00* (2006.01)
*F04D 29/58* (2006.01)
*F25B 1/053* (2006.01)
*F04D 17/10* (2006.01)
*H02K 7/09* (2006.01)
*F04D 29/063* (2006.01)
*F16C 33/66* (2006.01)
*F04C 2/02* (2006.01)

(52) U.S. Cl.
CPC ...... *F04C 2240/50* (2013.01); *F16C 2360/44* (2013.01); *F16C 2362/52* (2013.01)

FLUSHING OF A TOUCHDOWN BEARING

CROSS REFERENCE TO A RELATED APPLICATION

The application claims the benefit of U.S. Provisional Application No. 62/989,166 filed Mar. 13, 2020, the contents of which are hereby incorporated in their entirety.

BACKGROUND

Vapor compression systems (e.g., chillers) commonly include a compressor, a condenser, an expansion valve, and an evaporator. Refrigerant circulates through the vapor compression system in order to provide cooling to a medium (e.g., air). The refrigerant exits the compressor through a discharge port at a high pressure and a high enthalpy. The refrigerant then flows through the condenser at a high pressure and rejects heat to an external fluid medium. The refrigerant then flows through the expansion valve, which expands the refrigerant to a low pressure. After expansion, the refrigerant flows through the evaporator and absorbs heat from another medium (e.g., air). The refrigerant then re-enters the compressor through a suction port, completing the cycle.

Compressors commonly include a motor rotor and a motor stator housed within a compressor housing. The rotor is fixed to and rotates with a rotating shaft, and the stator is fixed inside the compressor housing. Depending on the type of compressor, magnetic bearings may be used to levitate the rotating shaft while the compressor is operational. Touchdown bearings are commonly used by compressors with magnetic bearings to provide for smooth rotation of the shaft and protect the rotor when the compressor is shutdown. The touchdown bearings can be in the form of ball bearings or sleeve bearings. Sleeve bearings are shaped in the form of a sleeve around the rotating shaft, with a clearance between the rotating shaft and the interior facing surface of the sleeve bearing. Commonly, lubricant (e.g., oil) is used to fill the clearance between the sleeve bearing and the rotating shaft. Ball bearings are shaped in the form of a ball and are placed between a pair of races, with a small clearance between the ball and the races. Multiple ball bearings may be placed around the rotating shaft.

One potential issue with using ball bearings as the touchdown bearings is the potential for debris to deposit within the clearance between the ball and the races. This debris may be in the form of weld particles and/or dust particles within the vapor compression system. If debris builds up within the clearance there is potential that touchdown bearing will seize (e.g., being incapable of rotating and/or resisting rotation), which may result in damage to the rotating shaft.

Accordingly, there remains a need for a way to flush the touchdown bearings within a compressor to prevent, or at least mitigate, the buildup of debris within the touchdown bearings.

BRIEF DESCRIPTION

According to one embodiment, a compressor including an electric motor, a magnetic bearing, a touchdown bearing, and a supply line is provided. The electric motor may be used for driving a rotating shaft. The magnetic bearing may be used for levitating the rotating shaft when the compressor is operational. The magnetic bearing is disposed adjacent to the electric motor. The touchdown bearing is configured to rotate and support the rotating shaft when the compressor is shutdown. The touchdown bearing is disposed adjacent to the rotating shaft. The supply line is in fluid communication with the touchdown bearing. The supply line is configured for injecting a working fluid toward the touchdown bearing. The working fluid is injected approximately continuously by the supply line when the compressor is operational.

In accordance with additional or alternative embodiments, the touchdown bearing is disposed at least partially between a pair of races.

In accordance with additional or alternative embodiments, the compressor further includes a spacer ring disposed adjacent to the touchdown bearing, wherein the spacer ring includes a passage disposed therein, and the working fluid is injected through the passage toward the touchdown bearing.

In accordance with additional or alternative embodiments, the supply line is configured to couple to the passage in the spacer ring.

In accordance with additional or alternative embodiments, at least a portion of the working fluid is drained through a drain in the electric motor.

In accordance with additional or alternative embodiments, injecting the working fluid causes the touchdown bearing to rotate between the pair of races.

In accordance with additional or alternative embodiments, injecting the working fluid mitigates a buildup of a debris between the touchdown bearing and the races.

In accordance with additional or alternative embodiments, the working fluid is injected at a velocity of at least five (5) ft./sec.

In accordance with additional or alternative embodiments, the passage has a diameter between 0.05 and 0.1 inches.

In accordance with additional or alternative embodiments, the injecting of the working fluid stops when the compressor is shutdown.

In accordance with additional or alternative embodiments, the touchdown bearing is a ball bearing.

In accordance with additional or alternative embodiments, the compressor includes at least three touchdown bearings and at least three supply lines, each respective supply line configured to inject the working fluid toward each respective touchdown bearing.

In accordance with additional or alternative embodiments, the working fluid is in a substantially liquid phase.

In accordance with additional or alternative embodiments, the working fluid is R-134A refrigerant.

In accordance with additional or alternative embodiments, the compressor is a centrifugal compressor.

In accordance with additional or alternative embodiments, the compressor is an axial compressor.

In accordance with additional or alternative embodiments, the compressor is a scroll compressor.

According to another aspect of the disclosure, a vapor compression system including a condenser and a compressor is provided. The condenser may be used for transferring heat from a working fluid to an external fluid medium. The compressor is in fluid communication with the condenser. The compressor includes an electric motor, a magnetic bearing, a touchdown bearing, and a supply line. The electric motor may be used for driving a rotating shaft. The magnetic bearing may be used for levitating the rotating shaft when the compressor is operational. The magnetic bearing is disposed adjacent to the electric motor. The touchdown bearing is configured to rotate and support the rotating shaft when the compressor is shutdown. The touchdown bearing is disposed adjacent to the rotating shaft. The supply line is in fluid communication with the touchdown bearing and the condenser. The supply line is configured for injecting working fluid from the condenser toward the touchdown bearing. The working fluid is injected approximately continuously by the supply line when the compressor is operational.

In accordance with additional or alternative embodiments, the external fluid medium includes at least one of: an air supply and a water supply.

In accordance with additional or alternative embodiments, the working fluid is a refrigerant.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

As will be described below, a compressor with a supply line for injecting a working fluid (e.g., a refrigerant) toward the touchdown bearing(s) within the compressor, and a vapor compression system incorporating the same are provided. The touchdown bearing(s) may be in the form of one or more ball bearing(s). The injecting of the working fluid may make it possible to prevent, or at least mitigate, the buildup of debris within the touchdown bearing(s) (e.g., between the ball and the races of the touchdown bearing). In certain instances, the working fluid flushes the touchdown bearing(s) by injecting the working fluid at a sufficient velocity so as to cause debris, if any, within the touchdown bearing(s) to exit the touchdown bearing(s). This flushing of the touchdown bearing(s) with working fluid may help prevent, or at least mitigate, the seizing of the touchdown bearing(s).

Figure 1:
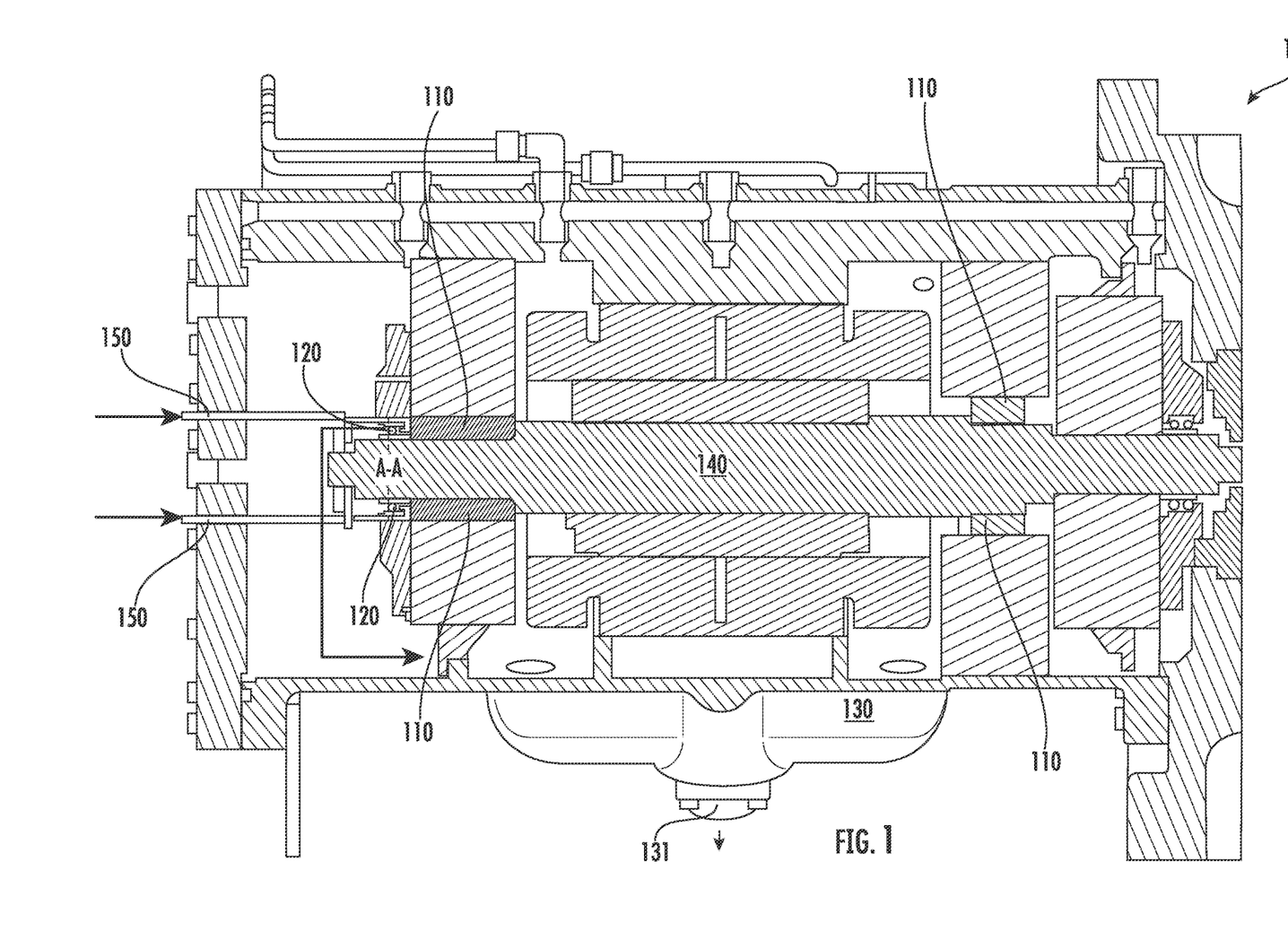
FIG. 1 is a cross-sectional side view of a compressor depicting the injection of a working fluid toward a touchdown bearing in accordance with one aspect of the disclosure.

With reference now to the Figures, a cross-sectional side view of a compressor 100 illustrating the injection of a working fluid toward a touchdown bearing 120 is shown in FIG. 1. As shown in FIG. 1, the compressor 100 includes an electric motor 130, a magnetic bearing 110, a touchdown bearing 120, and a supply line 150. The electric motor 130 is used for driving a rotating shaft 140. The magnetic bearing 110 is used for levitating the rotating shaft 140 when the compressor 100 is operational. The magnetic bearing 110 is disposed adjacent to the electric motor 130. The touchdown bearing 120 is used for supporting the rotating shaft 140 when the compressor 100 is shutdown. The touchdown bearing 120 is disposed adjacent to the rotating shaft 140. The supply line 150 is used for injecting a working fluid toward the touchdown bearing 120. The compressor 100 provides for the injection of the working fluid approximately continuously by the supply line 150 when the compressor is operational 100.

Figure 2:
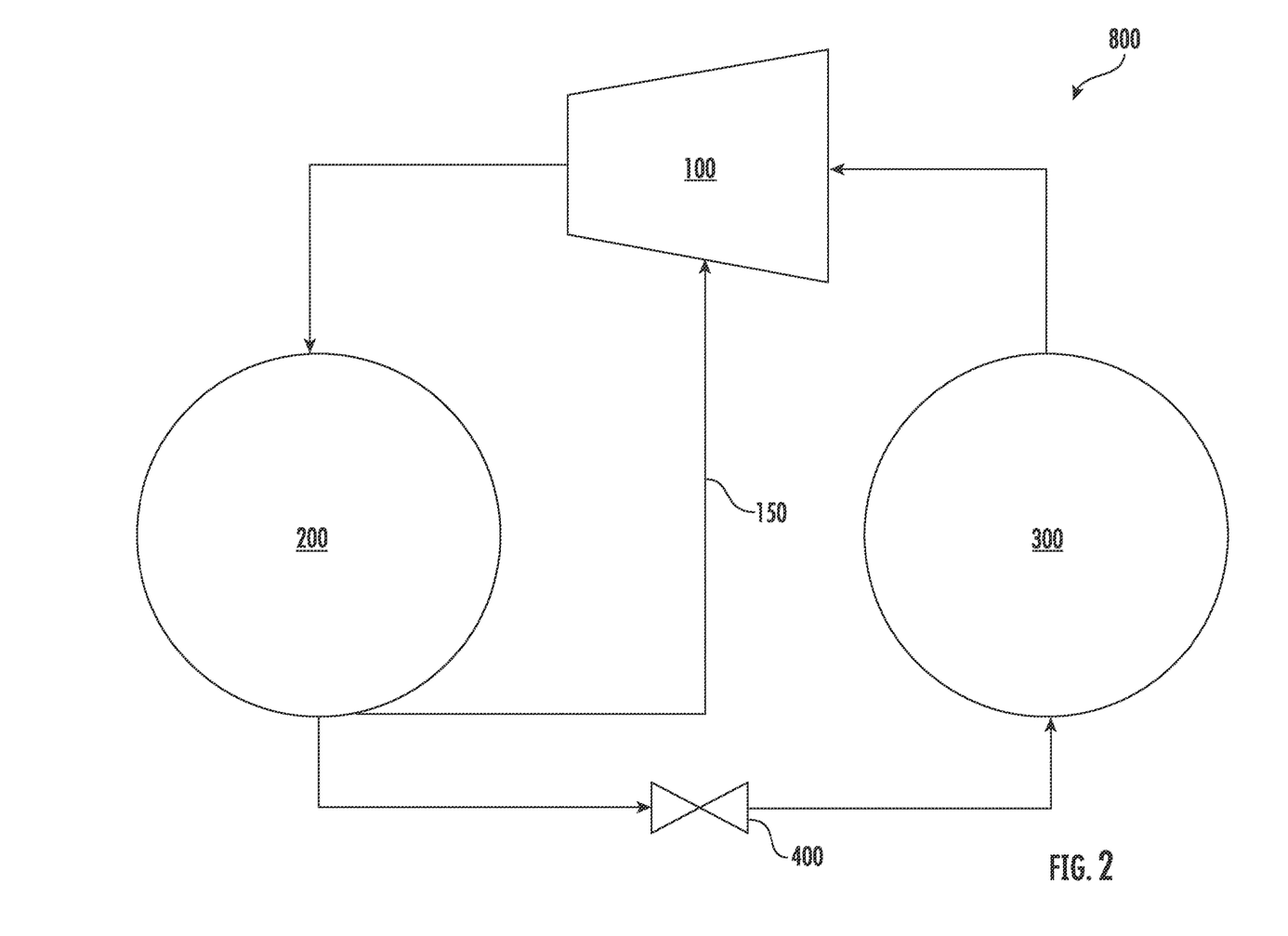
FIG. 2 is a schematic illustration of a vapor compression system including a compressor, a condenser, an evaporator, and an expansion valve, with a supply line between the condenser and the compressor in accordance with one aspect of the disclosure.

As shown in FIG. 2, the compressor 100 may be one component of a vapor compression system 800. The vapor compression system 800 may include a compressor 100, a condenser 200, an expansion valve 400, and an evaporator 300. In some embodiments, the compressor 100 is either a centrifugal compressor, an axial compressor, or a scroll compressor. The vapor compression system 800 may be configured to circulate refrigerant through the vapor compression system 800 to provide cooling to a medium (e.g., air, water, etc.). As shown in FIG. 2, the working fluid being injected toward the touchdown bearing(s) 120 of the compressor 100 may be provided from a condenser 200. This working fluid, in certain instances, is refrigerant from the condenser 200. The working fluid may be in a substantially liquid phase when being injected toward the touchdown bearing(s) 120. A substantially liquid phase can be interpreted to mean that more of the working fluid is in a liquid phase than a vapor phase. In certain instances, the vapor compression system 800 utilizes R-134A as the refrigerant, which is provided as the working fluid being injected toward the touchdown bearing(s) 120 of the compressor 100. It will be appreciated that other types of refrigerant may be used.

The working fluid may be injected toward the touchdown bearing(s) 120 approximately continuously by the supply line when the compressor 100 is operational. In certain instances, the compressor 100 is the driving force for injecting the working fluid toward the touchdown bearing(s) 120. Meaning that when the compressor 100 is operational the compressor 100, through generating a positive pressure, forces the working fluid toward the touchdown bearing(s) 120. In certain instances (e.g., when the compressor 100 is the driving force for injecting the working fluid toward the touchdown bearing(s) 120), the injecting of the working fluid stops when the compressor 100 is shutdown. This may be because, when the compressor 100 is shutdown there is no positive pressure being generated that would force the working fluid toward the touchdown bearing(s) 120. The compressor 100 may be seen as shutdown when the compressor 100 is not generating a positive pressure. The compressor 100 may be seen as being operational when the compressor 100 is generating a positive pressure.

Figure 4:
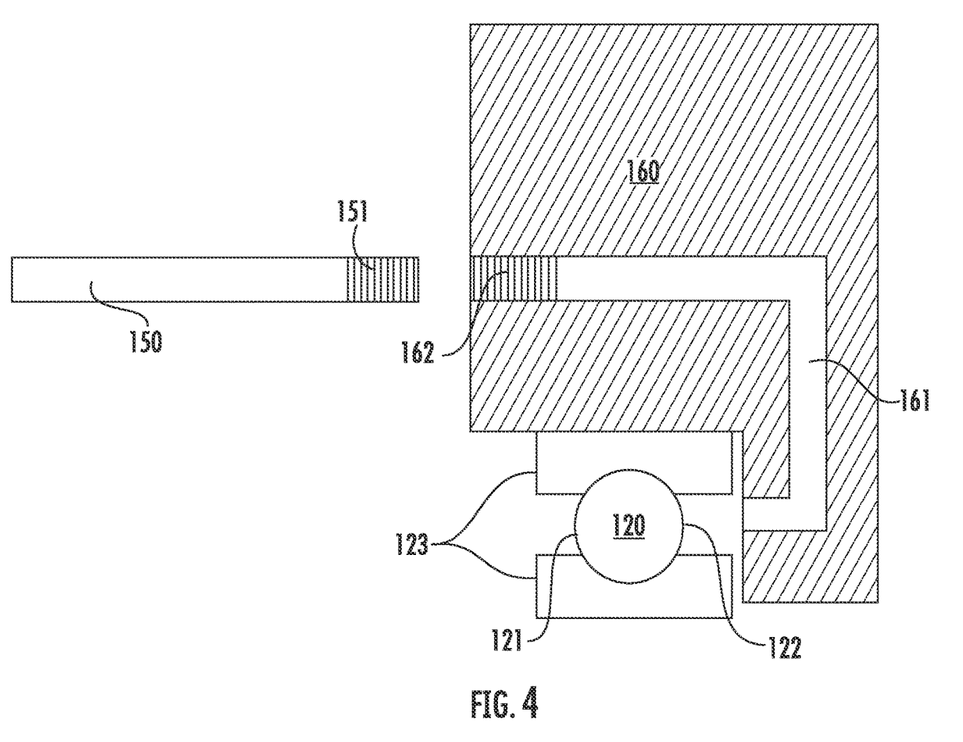
FIG. 4 is a cross-sectional view taken along cross-sectional line B-B from FIG. 3, depicting a touchdown bearing disposed adjacent to a spacer ring, in accordance with one aspect of the disclosure.

As described above, one or more touchdown bearing(s) 120 may be in the form of ball bearing(s). When a touchdown bearing 120 is in the form of a ball bearing the ball of the touchdown bearing 120 may be disposed, at least partially, between the races 123 (as shown in FIG. 4). The injecting of the working fluid may be completed so as to flush the touchdown bearing 120 to mitigate a buildup of a debris between the ball of the touchdown bearing 120 and the races 123 of the touchdown bearing 120. To illustrate the injection of the working fluid toward the touchdown bearing 120, the touchdown bearing 120 may be described to include a front side 121 and a back side 122.

Figure 3:
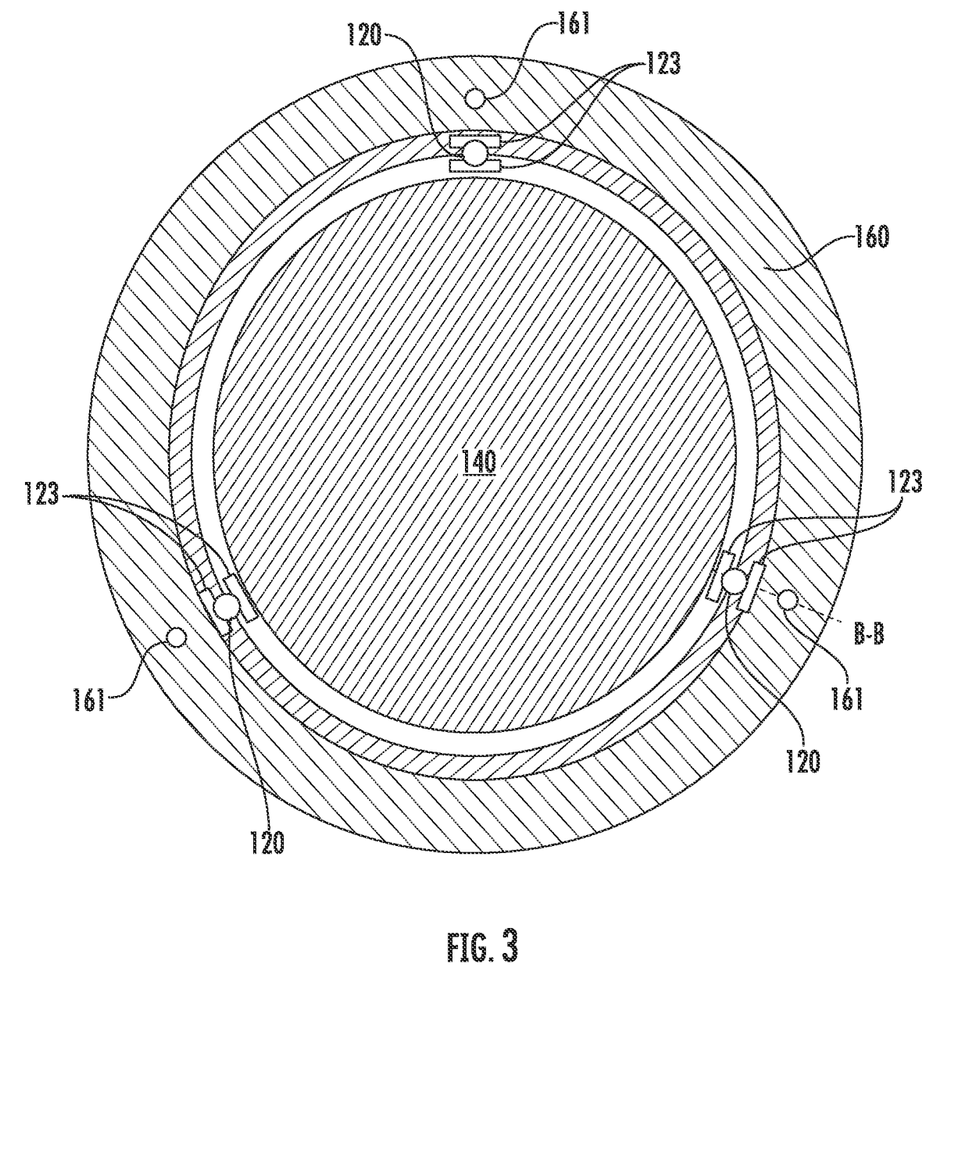
FIG. 3 is a cross-sectional view taken along cross-sectional line A-A from FIG. 1, depicting multiple touchdown bearings disposed adjacent to a rotating shaft and a spacer ring, in accordance with one aspect of the disclosure.
Figure 5:
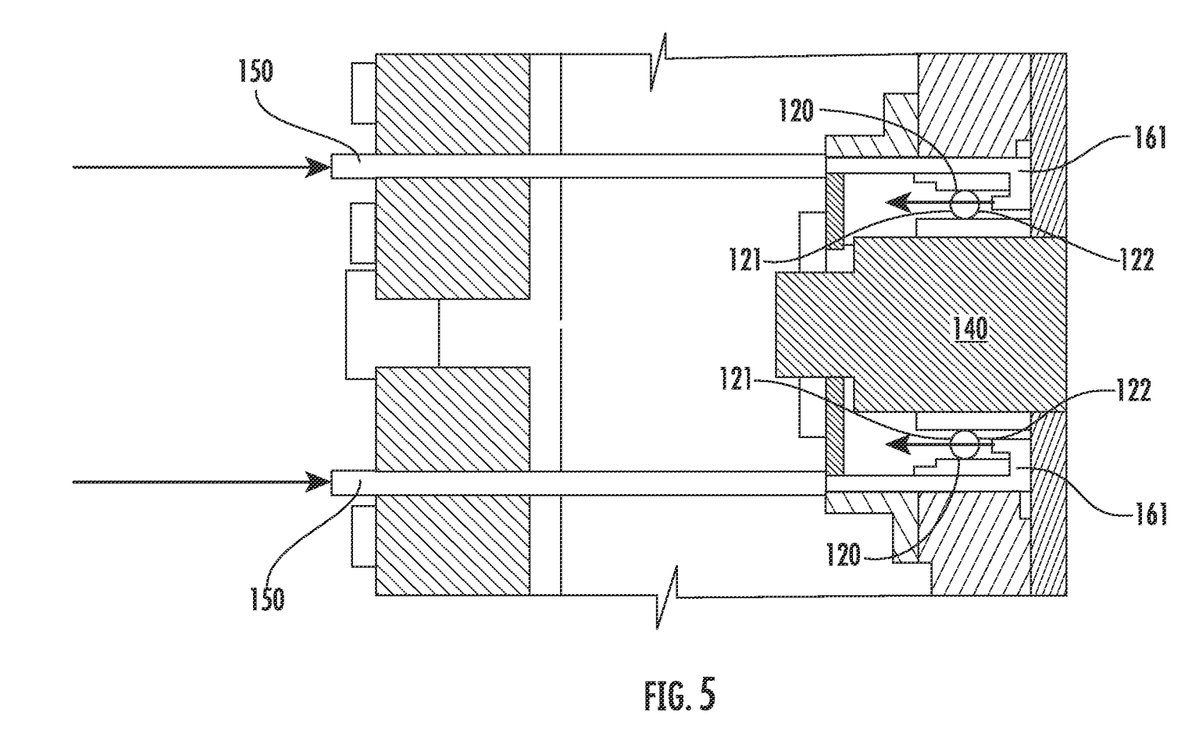
FIG. 5 is an exploded cross-sectional side view of the compressor shown in FIG. 1 depicting the injection of the working fluid toward a back side of the touchdown bearing in accordance with one aspect of the disclosure.

As shown in FIGS. 3-5, the working fluid may be injected through a passage 161 in a spacer ring 160 toward the back side 122 of a touchdown bearing 120. The passage 161 in the spacer ring 160 may, in certain instances, have a diameter between 0.05 and 0.1 inches. It will be appreciated that the diameter may be smaller than 0.05 inches and greater than 0.1 inches. In certain instances, the passage 161 has an approximately constant diameter across the length of the passage 161. In certain instances, the passage 161 has a varying diameter across the length of the passage 161 (e.g., the diameter may be smaller at one end of the passage 161 than the other). It is envisioned that the passage 161 may be provided in any suitable configuration that enables the injection of a working fluid at a sufficient velocity toward a touchdown bearing so as to prevent, or at least mitigate, the buildup of debris around the touchdown bearing 120.

The spacer ring 160 may be shaped as an annular ring with a recessed portion that extends behind the touchdown bearing(s) 120. To transfer the working fluid from the supply line 150 through the passage 161 in the spacer ring 160, the supply line 150 may be configured to couple to the passage 161 in the spacer ring 160. Coupling the supply line 150 to the passage 161 in the spacer ring 160 may be interpreted to mean using any suitable mechanism for securing the supply line 150 to the passage 161 in the spacer ring 160 such that a working fluid can be transferred from the supply line 150 through the passage 161 in the spacer ring 160 toward the back side 122 of the touchdown bearing(s) 120.

In one non-limiting embodiment, the supply line 150 may be configured to couple to the passage 161 in the spacer ring 160 using at least one of: a locking ball mechanism and a threaded connection. The locking ball mechanism may extend from an inner surface of either the supply line 150 or the passage 161 in the spacer ring 160. The locking balls of the locking ball mechanism may be capable of extending radially inward and outward. In certain instances, to couple the supply line 150 to the passage 161 in the spacer ring 160, the inner surface of the supply line 150 may be placed over the outer surface of the passage 161 in the spacer ring 160. In certain instances, to couple the supply line 150 to the passage 161 in the spacer ring 160, the outer surface of the supply line 150 may be placed within the inner surface of the passage 161 in the spacer ring 160. Regardless of whether the locking balls are incorporated on the supply line 150 or the passage 161 in the spacer ring 160, the locking balls may extend and set into a recess (e.g., in the supply line 150 or the passage 161 in the spacer ring 160) when coupled. To extend the locking balls in an outward direction toward the recess, the locking ball mechanism may incorporate a coupler spring.

As further shown in FIG. 4, when using a threaded connection to couple the supply line 150 to the passage 161 in the spacer ring 161, both the supply line 150 and the passage 161 in the spacer ring 161 may include threaded portions 151, 162. The threaded portion 151 of the supply line 150 may extend circumferentially around an inner surface or an outer surface of the supply line 150. The threaded portion 162 of the passage 161 in the spacer ring 160 may extend circumferentially around an inner surface or an outer surface of the passage 161 in the spacer ring 160. The threaded connection may allow for the supply line 150 and the passage 161 to be coupled to one another by mating the threaded portion 151 of the supply line 150 to the threaded portion 162 of the passage 161 in the spacer ring 160.

Regardless of how the supply line 150 and the passage 160 in the spacer ring 160 are coupled, the compressor 100 may provide for the working fluid to be injected from the back side 122 of the touchdown bearing(s) 120 toward the front side 121 of the touchdown bearing(s) 120. Injecting the working fluid from the back side 122 of the touchdown bearing(s) 120 toward the front side 121 of the touchdown bearing(s) 120 may force debris, if any, away from the touchdown bearing(s) 120 (e.g., picking up the debris with the working fluid). In certain instances, the injecting of the working fluid may cause the touchdown bearing(s) 120 to rotate. This rotation of the touchdown bearing(s) 120 may help prevent the touchdown bearing(s) 120 from seizing (e.g., from being incapable of rotating and/or resisting rotation). By injecting the working fluid from the back side 122 of the touchdown bearing(s) 120, debris may be forced away from the electric motor 130. Any debris picked up by the working fluid and forced away from the electric motor 130 may be drained through a drain 131 in the electric motor 130.

To effectively flush the touchdown bearing(s) 120 the working fluid may be injected by the supply line 150 at a velocity of at least five (5) ft./sec. When the compressor 100 is the driving force for injecting the working fluid, the velocity may be dependent, at least in part, on the operation of the compressor 100 (e.g., the velocity may increase or decrease as a function of the speed at which the compressor 100 is operated). As described above, the velocity of the working fluid may also be dependent, at least in part, on the configuration of the passage 161 in the spacer ring 160. It is envisioned that the velocity of the working fluid is sufficiently high enough to prevent, or at least mitigate, the buildup of debris within the touchdown bearing(s) 120.

In certain instances, the compressor 100 includes at least three touchdown bearings 120 and at least three supply lines 150, where each respective supply line 150 is configured to inject the working fluid toward each respective touchdown bearing 120. Although the compressor 100 may include an independent supply line 150 for each touchdown bearing 120, it is envisioned that the working fluid may be injected toward each touchdown bearing 120 through use of any number of supply lines 150 so long as working fluid is injected toward at least one touchdown bearing 120 in an approximately continuous manner by the supply line(s) 150 when the compressor 100 is operational. In certain instances, the compressor 100 may include multiple touchdown bearings 120 and only one supply line 150. In certain instances, the compressor 100 may include only one touchdown bearing 120 and multiple supply lines 150. In certain instances, the compressor 100 may include only one touchdown bearing 120 and only one supply line 150. Regardless of the number touchdown bearings 120 and/or supply lines 150, the design and configuration of the compressor 100 enables the flushing of at least one touchdown bearing 120 within a compressor 100 to prevent, or at least mitigate, the buildup of debris within the respective touchdown bearing(s) 120.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A compressor comprising:
an electric motor for driving a rotating shaft;

a magnetic bearing for levitating the rotating shaft when the compressor is operational, the magnetic bearing disposed adjacent to the electric motor;

a touchdown bearing configured to rotate and support the rotating shaft when the compressor is shutdown, the touchdown bearing disposed adjacent to the rotating shaft;

a supply line in fluid communication with the touchdown bearing, the supply line configured for continuously injecting a working fluid toward the touchdown bearing when the compressor is operational; and a spacer ring disposed adjacent to the touchdown bearing, wherein the spacer ring includes a passage disposed therein, and the working fluid is injected through the passage toward the touchdown bearing.

2. The compressor of claim 1, wherein the touchdown bearing is disposed at least partially between a pair of races.

3. The compressor of claim 1, wherein the supply line is configured to couple to the passage in the spacer ring.

4. The compressor of claim 1, wherein at least a portion of the working fluid is drained through a drain in the electric motor.

5. The compressor of claim 2, wherein injecting the working fluid causes the touchdown bearing to rotate between the pair of races.

6. The compressor of claim 2, wherein injecting the working fluid mitigates a buildup of a debris between the touchdown bearing and the races.

7. The compressor of claim 1, wherein the working fluid is injected at a velocity of at least five ft./sec.

8. The compressor of claim 1, wherein the passage comprises a diameter between 0.05 and 0.1 inches.

9. The compressor of claim 1, wherein the injecting of the working fluid stops when the compressor is shutdown.

10. The compressor of claim 1, wherein the touchdown bearing is a ball bearing.

11. The compressor of claim 1, wherein the compressor comprises at least three touchdown bearings and at least three supply lines, each respective supply line configured to inject the working fluid toward each respective touchdown bearing.

12. The compressor of claim 1, wherein the working fluid is in a substantially liquid phase.

13. The compressor of claim 1, wherein the working fluid is R-134A refrigerant.

14. The compressor of claim 1, wherein the compressor is a centrifugal compressor.

15. The compressor of claim 1, wherein the compressor is an axial compressor.

16. The compressor of claim 1, wherein the compressor is a scroll compressor.

17. A vapor compression system comprising:

a condenser for transferring heat from a working fluid to an external fluid medium; and a compressor in fluid communication with the condenser, the compressor comprising:

an electric motor for driving a rotating shaft;

a magnetic bearing for levitating the rotating shaft when the compressor is operational, the magnetic bearing disposed adjacent to the electric motor;

a touchdown bearing configured to rotate and support the rotating shaft when the compressor is shutdown, the touchdown bearing disposed adjacent to the rotating shaft;

a supply line in fluid communication with the touchdown bearing and the condenser, the supply line configured for continuously injecting working fluid from the condenser toward the touchdown bearing when the compressor is operational; and a spacer ring disposed adjacent to the touchdown bearing, wherein the spacer ring includes a passage disposed therein, and the working fluid is injected through the passage toward the touchdown bearing.

18. The vapor compression system of claim 17, wherein the external fluid medium is comprised of at least one of: an air supply and a water supply.

19. The vapor compression system of claim 17, wherein the working fluid is a refrigerant.

* * * * *